(12) United States Patent  (10) Patent No.: US 8,196,463 B2
Priestman et al.  (45) Date of Patent: Jun. 12, 2012

(54) WATER DETECTION DEVICE

(75) Inventors: Paul Priestman, London (GB); Mike Beadman, Royston (GB)

(73) Assignees: Priestman Goode (GB); Cambridge Design Partnership LLP (GB)

( * ) Notice: Subject to any disclaimer, the term of this patent is extended or adjusted under 35 U.S.C. 154(b) by 314 days.

(21) Appl. No.: 12/478,892

(22) Filed: Jun. 5, 2009

(65) Prior Publication Data

US 2009/0301167 A1 Dec. 10, 2009

(30) Foreign Application Priority Data

Jun. 5, 2008 (GB) .................................. 0810239.4

(51) Int. Cl.
*G01F 17/00* (2006.01)
(52) U.S. Cl. ........................................................ 73/149
(58) Field of Classification Search ................... 73/149, 73/861; 702/45
See application file for complete search history.

(56) References Cited

U.S. PATENT DOCUMENTS

| 251,451 | A | * | 12/1881 | Hughes | ............................ 112/69 |
| 3,365,945 | A | * | 1/1968 | Parks | ............................... 73/223 |
| 3,762,440 | A | * | 10/1973 | Bryant | ............................ 137/551 |
| 4,253,341 | A | * | 3/1981 | Ikeda et al. | .................. 73/861.77 |
| 4,840,064 | A | * | 6/1989 | Fudim | .......................... 73/290 B |
| 4,922,855 | A |  | 5/1990 | Tomizawa et al. | |
| 5,792,964 | A | * | 8/1998 | van den Berg | ............. 73/861.15 |
| 7,306,115 | B2 | * | 12/2007 | Beachy | ............................ 222/20 |
| 7,593,789 | B2 | * | 9/2009 | Gougerot et al. | .............. 700/275 |
| 7,742,883 | B2 | * | 6/2010 | Dayton et al. | ................... 702/45 |

FOREIGN PATENT DOCUMENTS

| GB | 251451 | 12/1925 |
| GB | 2434207 A | 7/2007 |

OTHER PUBLICATIONS

Pour Show, Business Life, 1 page, Oct. 2006.
UK Intellectual Property Office Search Report dated Sep. 5, 2008, 2 pages.

* cited by examiner

*Primary Examiner* — Lisa Caputo
*Assistant Examiner* — Octavia Davis-Hollington
(74) *Attorney, Agent, or Firm* — Greenberg Traurig, LLP

(57) ABSTRACT

An apparatus for indicating a volume of liquid flow, comprising a liquid sensor for sensing the presence of a liquid, a timer activated when the liquid sensor indicates the presence of a liquid, a calculator to calculate the volume of liquid flow dependent upon the time for which the timer is activated, and an indicator to provide an indication of the volume of fluid calculated by the calculation means.

15 Claims, 6 Drawing Sheets

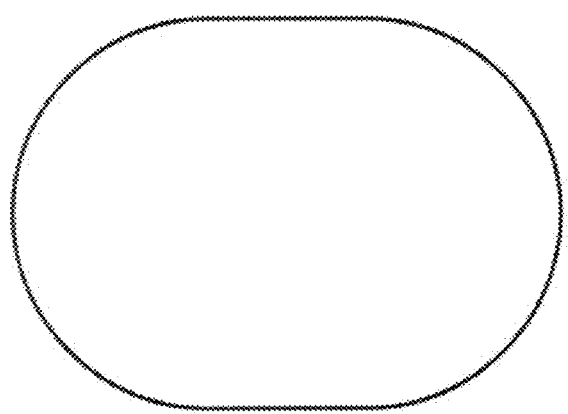
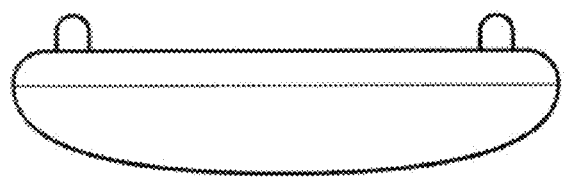
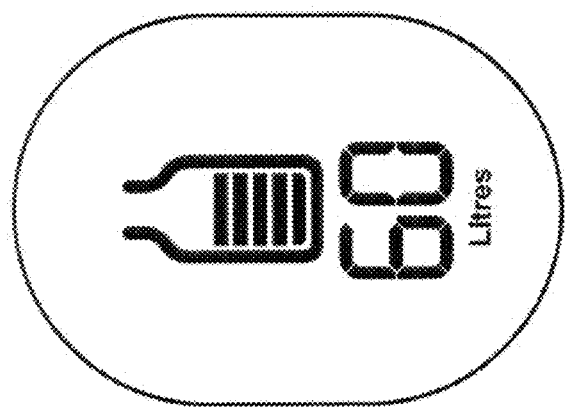
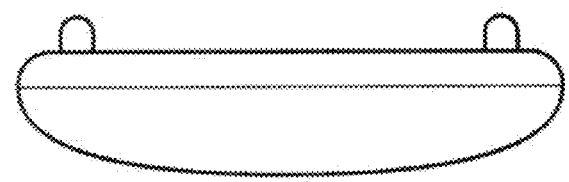
Figure 3

WATER DETECTION DEVICE

RELATED APPLICATION

In accordance with 35 U.S.C. §119, this application claims the benefit of GB Application No. 0810239.4 filed on Jun. 5, 2008.

BACKGROUND

This invention relates to a device for the detection of water and in particular to a low-cost device for monitoring water use.

The efficient use of water is an important environmental and economic consideration. Domestic water usage, and in particular wastage, is an area in which education of consumers may lead to a significant reduction in water usage.

Domestic water users rarely have an appreciation of their usage of water, and in particular wastage of water due to taps running when the water is not being used. For example, it is common for a tap to be left running while a person brushes their teeth, even though no use is made of the water. Wastage of hot water is more significant than of cold water as not only is the water lost, but also the energy spent heating that water.

Although notifying the public about the importance of conserving water is partially successful, a greater awareness of the issue is required to create a significant change in consumer's behaviour.

There is therefore a need for an efficient means of highlighting water wastage to the public.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

There is provided an apparatus for indicating a volume of liquid flow, comprising a liquid sensor for sensing the presence of a liquid, a timer activated when the liquid sensor indicates the presence of a liquid, a calculator to calculate the volume of liquid flow dependent upon the time for which the timer is activated, and an indicator to provide an indication of the volume of fluid calculated by the calculation means.

There is also provided a method of calibrating a water measurement apparatus, comprising the steps of starting a timer in the apparatus, dispensing a predetermined volume of water at a typical flow-rate from the water outlet in conjunction with which the apparatus will be utilised, stopping the timer when the predetermined volume of water has been dispensed, and calibrating the apparatus utilising the time taken to dispense the predetermined volume of water.

Various optional features are described herein and in the claims of this application.

DESCRIPTION OF THE DRAWINGS

Embodiments of the present invention will now be further described, by way of example, with reference to the drawings, wherein:

FIG. 3 shows a further embodiment of a device configured to be positioned in a sink for measuring and indicating water volume;

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although publishing information on water wastage brings the problem to people's attention, the current invention realises that a more effective way of causing consumers to reduce wastage would be to draw that wastage to the consumer's attention at the time the waste occurs. Accordingly, the current invention provides a device for indicating water usage in a domestic environment. Various embodiments are described, for example for detecting water usage at the tap or at the outlet of the sink. An embodiment provides a device for positioning in a sink which detects and indicates water flow to a person using that sink. Embodiments of the invention may provide an indication of water volume flowing out of the sink, or may provide an alert each time certain quantities of water pass out of the sink. In order to encourage the user to fill a sink, rather than to work under a running tap and allow water to run away, the device's alerts may cease or change when it is detected that the sink is being filled.

Figure 1:
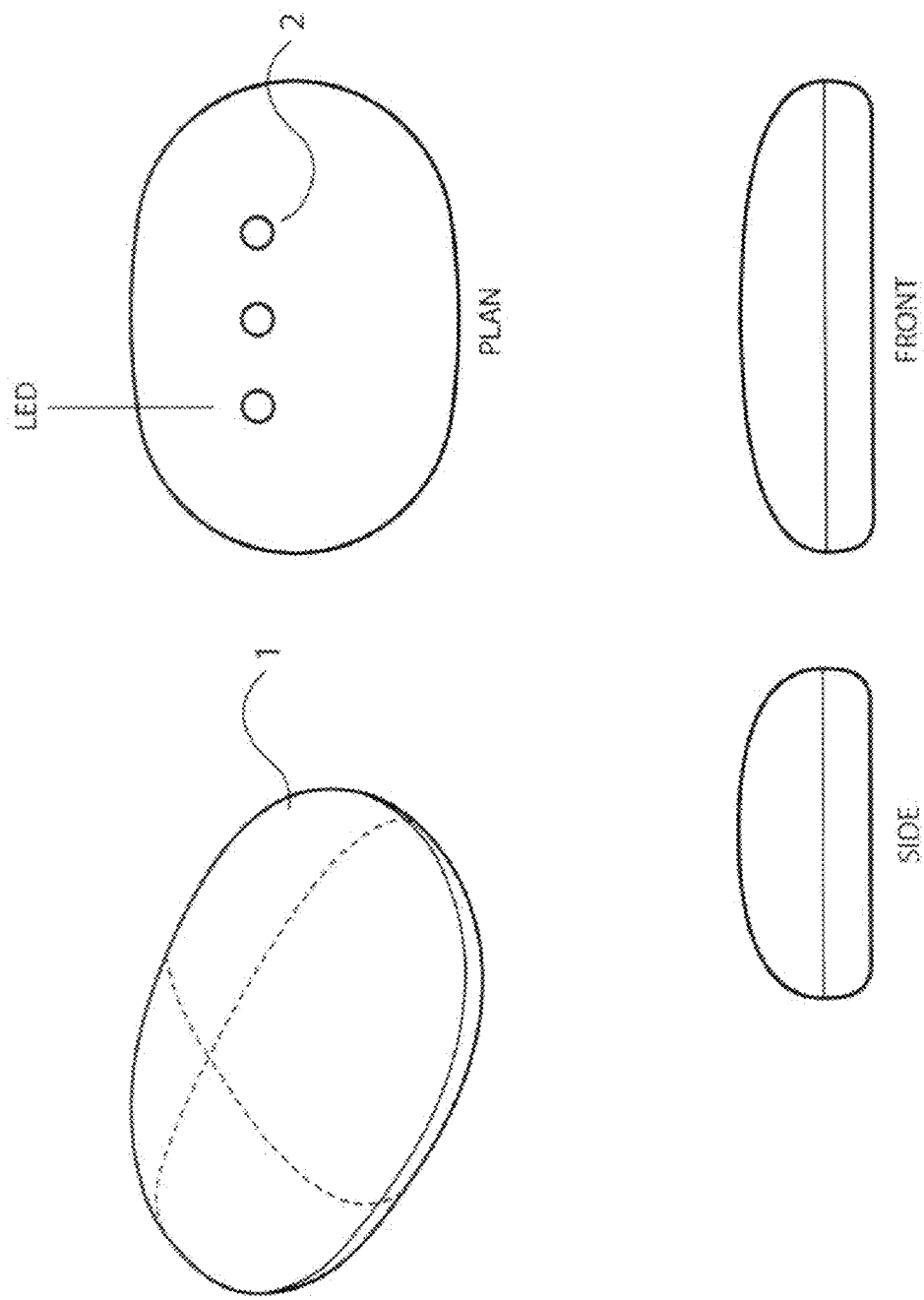
FIG. 1 shows an embodiment of a device configured to be positioned in a sink for measuring and indicating water volume.

FIG. 1 shows an embodiment of a device 1 for detecting water flow out of an outlet of a sink. The body of the device 1 is a generally smooth ovoid shape, such that the device will naturally slide to the lowest point in the sink in which it is disposed. The device is thus most likely to locate itself close to the outlet of the sink, thereby ensuring water flowing out of the sink is detected. A more spherical shape would allow the device to roll to the lowest point of the sink.

A liquid sensor is located on the device to detect liquid when it is in contact with the sensor. The sensor may be of any suitable type and particularly relevant options are discussed below. The device is provided with a indicator 2 for displaying an indication of water volume detected by the device. In the embodiment shown in FIG. 1, the display is a set of LEDs, but any suitable means may be utilised, for example a number display or bar-graph. In the embodiment shown in FIG. 1 each LED may be configured to illuminate in turn when a predefined volume of water is detected.

Figure 2:
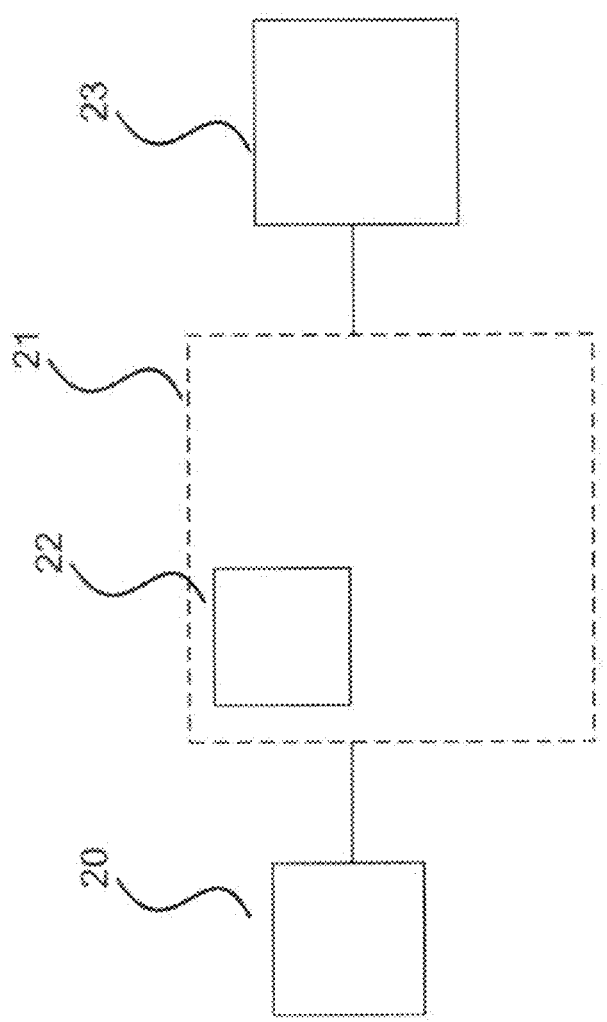
FIG. 2 shows a schematic diagram of a device for measuring water volume.

FIG. 2 shows a schematic diagram of a device shown in FIG. 1. The liquid sensor 20 is connected to a processing system 21 configured to respond to detection of liquid by the sensor 20. The processing system 21 comprises a counter 22 which counts while liquid is detected and thus provides an indication of the quantity of water that has been detected by the device. The counter 22 is started by the detection of water by the sensor 20, and stopped when water is no longer detected by the sensor 20. By calibration of the speed of counting to water flow-rate the counter 22 can be configured to provide an indication of water volume. A display 23 is connected to the processing system 21 and controlled to indicate the volume of liquid detected.

The processing system 21 may be provided by a microcontroller or similar processing device, suitably programmed to perform the required functions. Alternatively, discrete logic devices may be utilised.

FIG. 3 shows an embodiment of the device comprising a numerical and graphical indication of water volume.

The detection device may comprise more than one liquid sensor, each disposed at a different position on the body of the device. Embodiments may be designed to roll or slide to the lowest point of the sink, and thus the orientation of the device in its working position is not known. The provision of more than one sensor can be utilised to ensure that whatever the orientation of the device, one of the sensors will be exposed to liquid flowing out of the sink and the device will therefore be activated. The device may also comprise more than one indicator, such that the indicator will be visible regardless of the orientation of the device in the sink. The indicator may also be provided by the whole device, or a substantial portion of the device, illuminating.

The provision of more than one sensor may also allow the device to distinguish between water flowing directly out of the sink, and water that is being held in the sink due to the closure of the outlet. When water is flowing directly out of the sink, the water level will generally be very low, and thus only the sensors located at the lowest points of the device will detect the liquid. However, when the sink is being filled the water level will increase and the liquid will be detected by more than one of the sensors. It is one intention of the device to encourage users to fill sinks rather than utilise a running tap, and therefore the indication provided by the device may change when it is detected that the sink is being filled. For example, the indication of volume may stop increasing, or the colour of the indicator may change from a first warning colour to a second colour indicating that the correct action is being taken.

In an alternative embodiment the outer body of the device may be provided with openings such that liquid can enter the device. The liquid sensors may be located within the outer body and are thus protected from contact with other items, for example the sink in which the device is disposed. Contact of the liquid sensors with an object may cause activation of the sensors and hence inaccurate measurement of liquid flow. Location of the sensors within the body may thus increase the accuracy of the device. The electronic system is adequately packaged, for example by encapsulation, to prevent any damage by contact with the liquid.

In alternative embodiments a body shape which is designed to stay in one place may be utilised rather than the rolling-shape described above. For example, a cuboid body may be utilised and the device would then be positioned in the preferred location by the user. Such a device may also be provided with an attachment means to secure it in the desired location. Other than the body shape, the features described hereinbefore are equally applicable to this embodiment. A further embodiment utilises a tripod or other multi-legged shape such that the device rests in a defined position. The liquid sensors may be mounted in any suitable position on the legs or body of the device. The legs may be arranged such that the device is stable when positioned in a sink with a sloping side. The display may be positioned on the top of the device such that it can be easily viewed, or as described previously the body or legs may form the indicator.

In an alternative embodiment, the liquid sensor is mounted on an extension of the device, which extension is configured to extend into the plug hole or outlet of the sink, such that it protrudes below the plug. The extension may be constructed to be thin, such that the plug can still seal the outlet, in spite of the extension. The liquid sensor in this embodiment is only exposed to liquid when it is running out of the sink, and therefore a more accurate indication of wasted water may be gained. One or more liquid sensors may also be provided on the body of the device for operation in conjunction with the liquid sensor positioned in the outlet. The sensor on the body may be positioned such that it only detects liquid once it has reached a reasonable depth and thus indicates the sink is filling. Such a pair of sensors may allow discrimination between water flowing through the outlet due to an emptying of a sink of water and water being allowed to flow directly out of the sink. In the former case liquid will be detected by both sensors. The latter is more likely to indicate wasted water and the device may be configured to only monitor such flow.

Sensors may also be provided to detect when the device is in contact with the bottom of the sink, or when it is floating, such that an alternative method of detecting when the sink is filling is provided.

Figure 4:
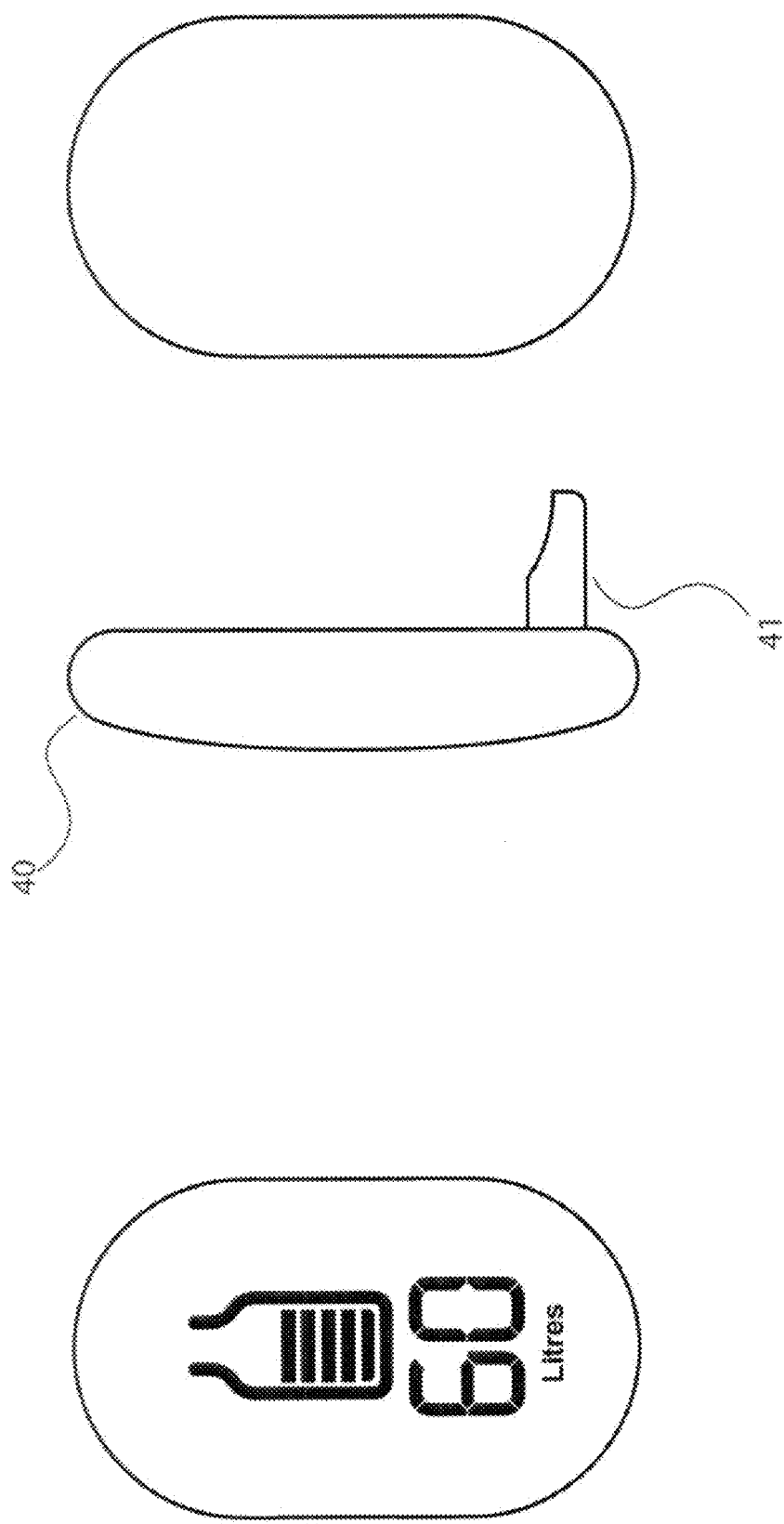
FIG. 4 shows an embodiment of a device configured to be attached to a tap for measuring and indicating water volume flowing out of that tap.

FIG. 4 shows an embodiment 40 for mounting on the outlet of a tap. This embodiment monitors the flow of water into the sink, rather than out of it. The device has an attachment means for attaching to a variety of designs of tap, and a sensor 41 which protrudes into the water flow to detect the presence of water. When water is detected by the sensor 41, the device records and indicates volumes as described hereinbefore. In an alternative embodiment, water may be sensed using an optical sensor, so that no contact with the water is required. Such a sensor may be advantageous as any material brought into contact with water which may be consumed must meet rigorous safety standards. The optical sensor may operate in a reflective or transmissive mode.

Figure 5:
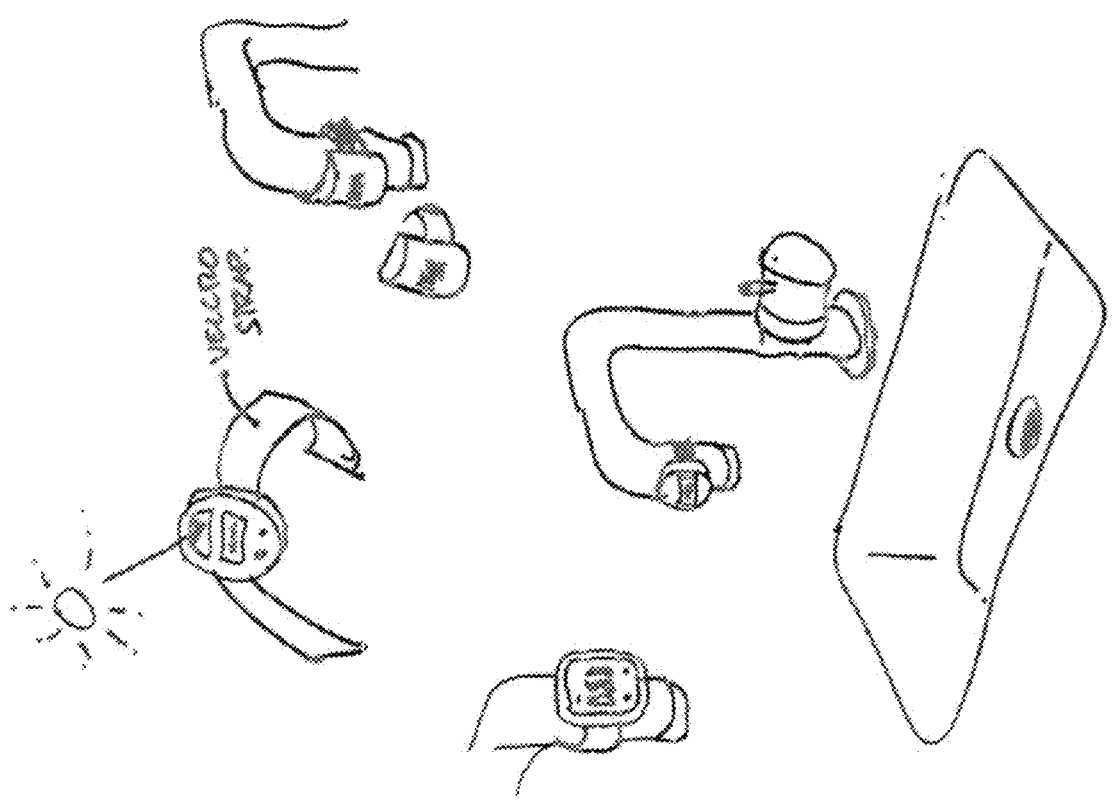
FIG. 5 shows a further embodiment of a device configured to be attached to a tap for measuring and indicating water volume flowing out of that tap.

FIG. 5 shows an alternative device utilising a hook-and-loop fastening strap to attach the device to the tap. The device is also provided with a solar panel such that the device can be powered without requiring batteries.

A method of calibration is also provided such that the accuracy of the device can be improved. To calibrate the device, it is set to a calibration mode and a predetermined volume of water is measured out of the tap. The device measures the time taken for that predetermined volume to be dispensed and utilises that time to calibrate measurements. When the calibration is performed, the tap is set to a typical flow-rate, and it is then assumed that the flow rate of the tap is consistent with that calibration flow-rate. Although the flow-rate in use will not always be a precise match for the calibration flow-rate, it has been shown to be sufficiently close to provide useful data. Furthermore, even if no calibration is performed, typical flow-rates of taps are relatively consistent and therefore the devices can be pre-calibrated for an average flow-rate that the device is likely to be utilised with.

The device may be supplied in a container that can be utilised to measure the predetermined volume of water for the calibration process. The liquid sensors may be utilised to change the mode of the device and to indicate when the predetermined volume measurements starts and stops.

A temperature sensor may also be provided in the device to detect the temperature of liquid coming in contact with the device. The device may be configured to monitor and/or indicate differently depending on the temperature of the water. For example, the device may therefore be configured to alert the user more rapidly when hot water is detected, or a specific indication may be provided that the water detected is hot (i.e. above a certain predefined temperature).

Figure 6:
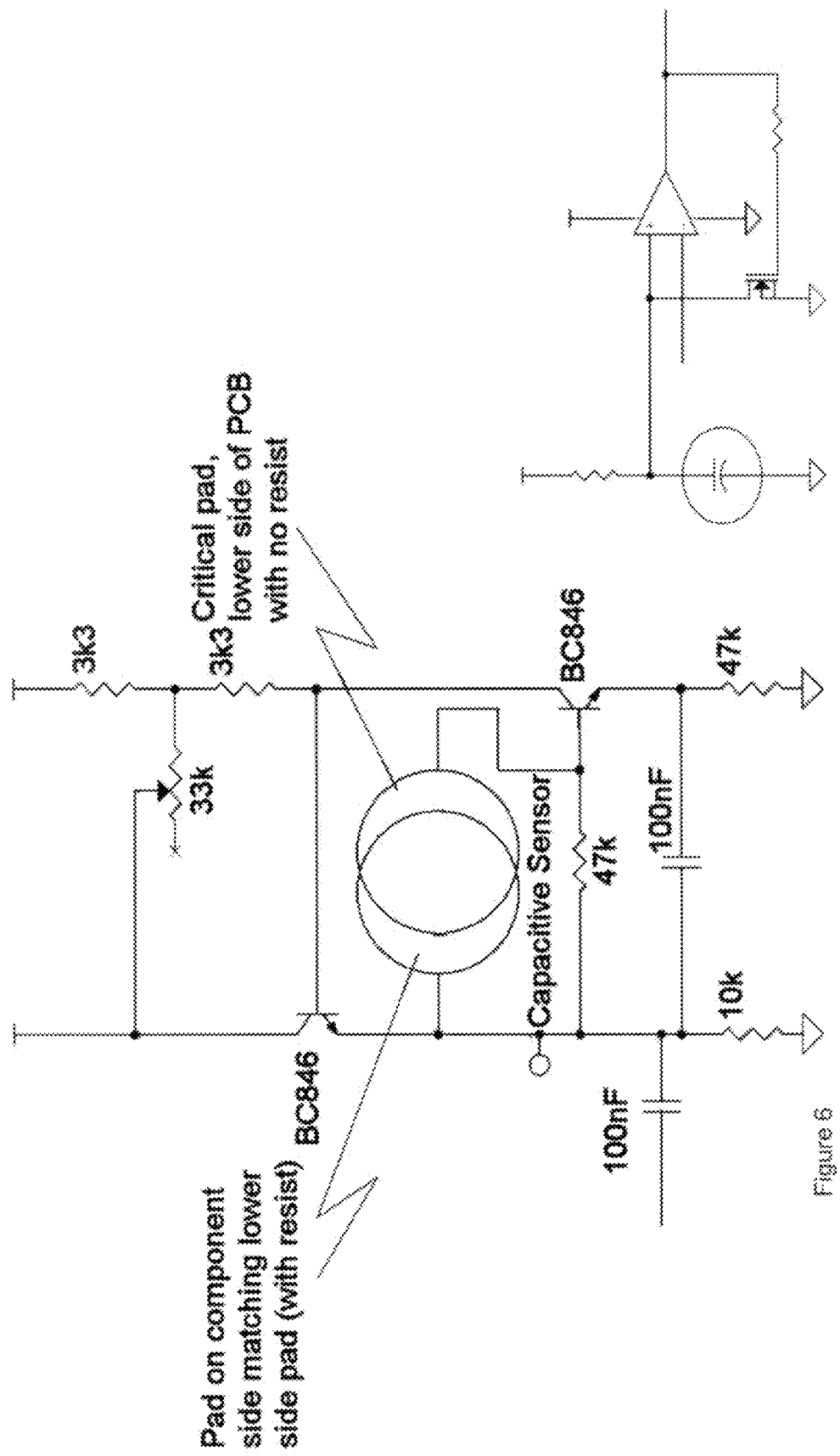
FIG. 6 shows schematic diagrams of suitable liquid sensors.

A capacitive sensor may be particularly appropriate for use as the liquid sensor. FIG. 6 shows two embodiments of capacitive sensors that may be utilised to detect liquid. In each sensor the presence of liquid modifies the electrical properties of the capacitor. That change is detected and utilised to indicate a presence of liquid.

The word 'sink' is used herein as a generic term to indicate any vessel into which water may be directed from a water outlet. References to sink are therefore intended to include other specific items such as baths and shower trays. Similarly, the term 'tap' is used to indicate any form of water outlet and accordingly encompasses items such as shower heads.

The methods described herein may be performed by software in machine readable form on a storage medium.

Any range or device value given herein may be extended or altered without losing the effect sought, as will be apparent to the skilled person.

It will be understood that the benefits and advantages described above may relate to one embodiment or may relate to several embodiments. It will further be understood that reference to 'an' item refers to one or more of those items.

The steps of the methods described herein may be carried out in any suitable order, or simultaneously where appropriate. Aspects of any of the examples described above may be combined with aspects of any of the other examples described to form further examples without losing the effect sought.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the scope of this invention.

What is claimed is:

1. An apparatus for indicating a volume of liquid flow, the apparatus being adapted to be loosely positioned in a sink, shower tray, or bath and comprising:
    a liquid sensor for sensing the presence of a liquid in contact with the apparatus as loosely placed in the sink, shower tray, or bath;
    a timer activated when the liquid sensor indicates the presence of a liquid;
    a calculator to calculate the volume of liquid flow dependent upon the time for which the timer is activated; and
    an indicator to provide an indication of the volume of fluid calculated by the calculation means.

2. An apparatus according to claim 1, wherein the device has a plurality of liquid sensors.

3. An apparatus according to claim 2, wherein at least two of the liquid sensors are configured to detect liquid at different heights in the sink.

4. An apparatus according to claim 2, wherein at least one liquid sensor is configured to be positioned in the water outlet of a sink, below a plug.

5. An apparatus according to claim 1, wherein the device is configured to roll to the lowest area of the sink.

6. An apparatus according to claim 1, wherein the device has a plurality of legs.

7. An apparatus according to claim 1, wherein the indicator provides an indication of volume by a graphical representation of that volume.

8. An apparatus according to claim 1, wherein the indicator is a light emitting device.

9. An apparatus according to claim 8, where the indicator illuminates when a predetermined volume of water is detected.

10. An apparatus according to claim 1, wherein the indicator is an audible indicator.

11. An apparatus according to claim 1, wherein the indicator is configured to provide an indication after a predetermined volume of water has flowed.

12. An apparatus for indicating a volume or liquid flow, the apparatus being adapted for loose placement in a sink, shower tray, or bath and comprising:
    an optical liquid sensor for sensing the presence of a liquid in contact with the apparatus as loosely placed in the sink, shower tray, or bath;
    a timer activated when the liquid sensor indicates the presence of a liquid;
    a calculator to calculate the volume of liquid flow dependent upon the time for which the timer is activated; and
    an indicator to provide an indication of the volume of fluid calculated by the calculation means.

13. An apparatus for indicating a volume of liquid flow, the apparatus being adapted for loose placement in a sink and comprising:
    a liquid sensor for sensing the presence of a liquid in contact with the apparatus as loosely placed in the sink;
    a timer activated when the liquid sensor indicates the presence of a liquid;
    a calculator to calculate the volume of liquid flow dependent upon the time for which the timer is activated; and
    an indicator to provide an indication of the volume of fluid calculated by the calculation means;
    wherein the device is configured to roll to the lowest area of the sink.

14. An apparatus for indicating a volume of liquid flow, the apparatus being adapted for loose placement in a sink and comprising:
    a plurality of liquid sensors for sensing the presence of a liquid in contact with the apparatus as loosely placed in the sink;
    a timer activated when the liquid sensor indicates the presence of a liquid;
    a calculator to calculate the volume of liquid flow dependent upon the time for which the timer is activated; and
    an indicator to provide an indication of the volume of fluid calculated by the calculation means;
    wherein at least two of the liquid sensors are arranged to detect liquid at different heights in the sink.

15. An apparatus for indicating a volume or liquid flow, the apparatus being adapted for loose placement in a sink, shower tray, or bath and comprising:
    a liquid sensor for sensing the presence of a liquid in contact with the apparatus as loosely placed in the sink, shower tray, or bath;
    a timer activated when the liquid sensor indicates the presence of a liquid;
    a calculator to calculate the volume of liquid flow dependent upon the time for which the timer is activated; and
    an indicator to provide an indication of the volume of fluid calculated by the calculation means;
    wherein the apparatus has a plurality of legs.

* * * * *